United States Patent
Holmes

(10) Patent No.: US 10,151,353 B2
(45) Date of Patent: Dec. 11, 2018

(54) MECHANICAL CLUTCH WITH FRICTION REDUCING INTERFACE

(71) Applicant: GM Global Technology Operations LLC, Detroit, MI (US)

(72) Inventor: Alan G. Holmes, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 156 days.

(21) Appl. No.: 14/556,815

(22) Filed: Dec. 1, 2014

(65) Prior Publication Data

US 2015/0204387 A1    Jul. 23, 2015

Related U.S. Application Data

(60) Provisional application No. 61/930,765, filed on Jan. 23, 2014.

(51) Int. Cl.

| F16D 11/10 | (2006.01) |
|---|---|
| F16D 15/00 | (2006.01) |
| F16D 25/08 | (2006.01) |
| F16D 11/14 | (2006.01) |
| F16D 11/00 | (2006.01) |

(52) U.S. Cl.
CPC .............. F16D 11/10 (2013.01); F16D 11/14 (2013.01); F16D 15/00 (2013.01); F16D 25/088 (2013.01); *F16D 2011/008* (2013.01)

(58) Field of Classification Search
CPC .... F16D 11/10; F16D 11/14; F16D 2011/008; F16D 192/108
USPC ........................................................ 192/69.5
See application file for complete search history.

(56) References Cited

U.S. PATENT DOCUMENTS

| 900,578 | A | * | 10/1908 | Nichols | ................... | F16D 11/10 |
| | | | | | | 192/108 |
| 1,748,146 | A | * | 2/1930 | Ricefield | .................. | F16D 3/24 |
| | | | | | | 29/441.1 |
| 2,050,910 | A | * | 8/1936 | Zancan | ................... | F16D 11/10 |
| | | | | | | 192/108 |
| 3,539,044 | A | * | 11/1970 | Grimstad | ................ | F16D 11/10 |
| | | | | | | 192/108 |
| 3,834,500 | A | * | 9/1974 | Tsuchiya | ............... | F16D 27/118 |
| | | | | | | 192/69.5 |
| 4,340,134 | A | * | 7/1982 | Reiss | ....................... | F16D 11/14 |
| | | | | | | 192/108 |
| 4,344,515 | A | * | 8/1982 | Grote | ........................ | F16D 3/68 |
| | | | | | | 192/69.8 |
| 4,679,675 | A | * | 7/1987 | Hanks | ....................... | F16P 1/00 |
| | | | | | | 192/69.5 |

(Continued)

FOREIGN PATENT DOCUMENTS

DE            172944 C        7/1906

*Primary Examiner* — Richard M Lorence

(57) ABSTRACT

A mechanical clutch such as a dog clutch includes a plurality of balls or rollers disposed in a carrier and positioned between opposed sets of straight cut teeth extending from opposed drive and driven elements. A ball or roller is positioned between each adjacent pair of teeth such that the torque load is transferred from the tooth on a first or drive element, through the ball or roller, to an adjacent projection or tooth on a second or driven element. The balls or rollers are maintained in position by the carrier having an inner ring and a concentric outer ring. Greatly reduced disengagement force, even under load, is exhibited by a clutch of this configuration.

18 Claims, 2 Drawing Sheets

(56) References Cited

U.S. PATENT DOCUMENTS

| | | | | |
|---|---|---|---|---|
| 5,035,311 A | * | 7/1991 | Girguis | F16D 7/08 |
| | | | | 192/56.57 |
| 5,573,096 A | * | 11/1996 | Erlebach | B60K 23/02 |
| | | | | 192/110 R |
| 6,942,082 B1 | * | 9/2005 | Bunnow | F16D 11/10 |
| | | | | 180/6.2 |
| 9,222,522 B2 | * | 12/2015 | Eluard | F16D 11/14 |

* cited by examiner

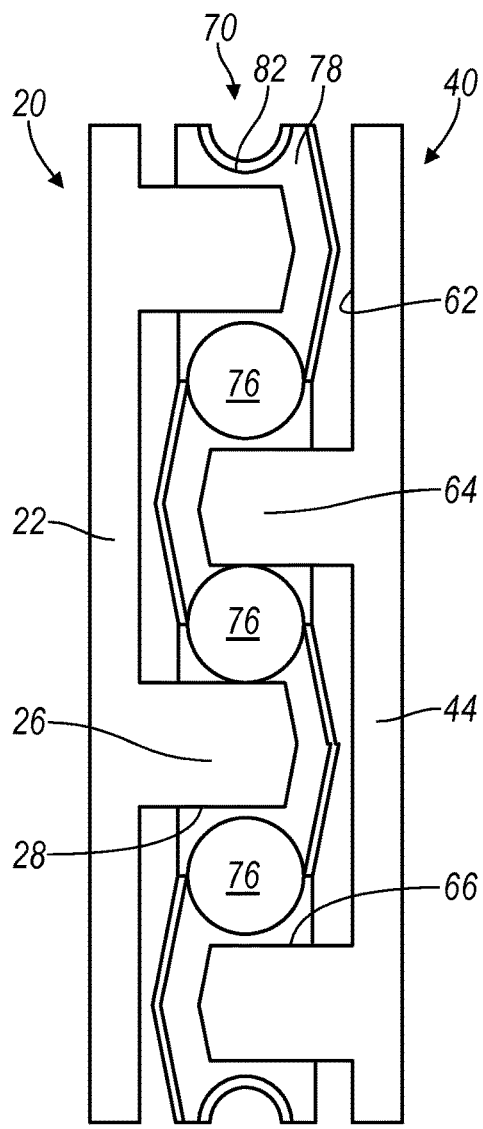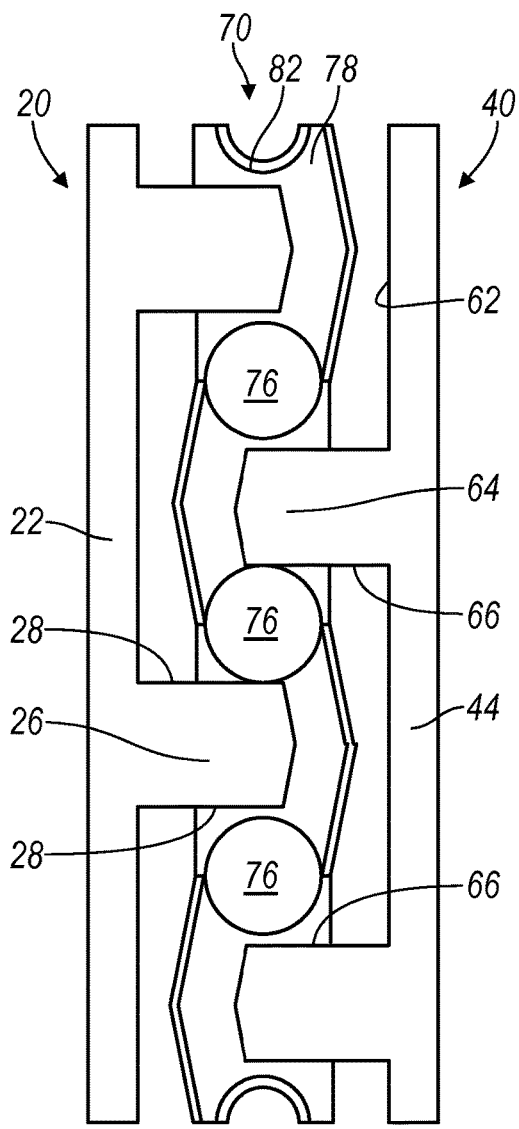
FIG. 3 　　　　　FIG. 4
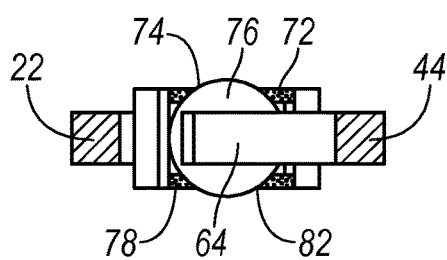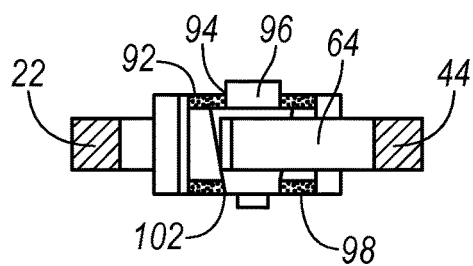
FIG. 5 　　　　　FIG. 6

MECHANICAL CLUTCH WITH FRICTION REDUCING INTERFACE

CROSS REFERENCE TO RELATED APPLICATION

This application claims the benefit of U.S. Provisional Patent Application Ser. No. 61/930,765, filed Jan. 23, 2014, which is hereby incorporated in its entirety herein by reference.

FIELD

The present disclosure relates to mechanical clutches having friction reducing interfaces and more particularly to mechanical clutches such as dog clutches having ball or roller interfaces which improve clutch disengagement, especially under load.

BACKGROUND

The statements in this section merely provide background information related to the present disclosure and may or may not constitute prior art.

Mechanical clutches such as dog clutches are common components in diverse mechanical power transmission devices. Whereas friction clutches are utilized in applications requiring the ability to synchronize and couple two rotating elements often having an initial speed differential, dog clutches are utilized in applications where there is generally little or no speed differential prior to engagement. Generally speaking, dog clutches comprehend a first rotating element having uniformly, circularly spaced projections and a second, co-axial element having complementarily disposed recesses. The projections and recesses may be so sized and arranged that the two elements are identical. Additionally, certain edges of the projections and recesses may be oblique such that the transmitted torque tends to achieve and maintain full engagement of the clutch elements.

Like many engineering compromises, the incorporation of oblique edges on the projections and recesses, while minimizing the possibility of spontaneous disengagement during power transmission, may also make the clutch difficult to intentionally disengage under load. In fact, even dog clutches with engaging edges that are flat, i.e., parallel to radial planes, may be difficult to disengage if they are carrying relatively significant torque loads unless and until the torque load across the projections and recesses is reduced or terminated.

Thus, while dog clutches provide a simple selectable connection between power transmission components which may require little or no external agency to maintain engagement, the difficulty of disengagement under load requires either that the clutch operator be extraordinarily robust or that load be reduced or removed from the clutch before it is disengaged. The present invention offers a third option.

SUMMARY

The present invention provides a mechanical clutch such as a dog clutch having a plurality of balls or rollers disposed in a carrier and positioned between opposed sets of straight cut, or substantially straight cut, projections or teeth. A ball or roller is positioned between each adjacent pair of projections or teeth such that the torque load is transferred from the projection or tooth on a first or drive element, through the ball or roller, to an adjacent projection or tooth on a second or driven element. The balls or rollers are maintained in position by the carrier having an inner ring and a concentric outer ring. Thus, torque is transmitted through contacting elements which, during disengagement under load, have rolling contact, rather than sliding contact. This reduced tooth-to-tooth friction, especially under load, greatly reduces the force required to disengage the clutch.

Thus it is an aspect of the present invention to provide a mechanical clutch having projections or teeth which have straight or nearly straight surfaces for transmitting torque and balls or rollers disposed between the projections or teeth.

It is a further aspect of the present invention to provide a mechanical clutch having first and second elements with projections or teeth and balls or rollers disposed between the projections or teeth of the first and second elements.

It is a still further aspect of the present invention to provide a mechanical clutch having first and second elements with straight cut projections or teeth and balls or rollers disposed between the projections or teeth of the first and second elements.

It is a still further aspect of the present invention to provide a mechanical clutch having first and second elements with straight cut projections or teeth and balls or rollers disposed in a carrier between the projections or teeth of the first and second elements.

It is a still further aspect of the present invention to provide a mechanical clutch having first and second elements with projections or teeth and balls or rollers disposed between the projections or teeth of the first and second elements which may be readily disengaged while torque is being transmitted through the clutch.

It is a still further aspect of the present invention to provide a dog clutch and operator having first and second elements with straight cut projections or teeth and balls or rollers disposed between the projections or teeth of the first and second elements.

Further advantages, aspects and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a diagrammatic side view of a fully engaged mechanical clutch according to the present invention;

FIG. 4 is a diagrammatic side view of a partially disengaged mechanical clutch according to the present invention;

FIG. 5 is a sectional view of a ball carrier and clutch teeth of a mechanical clutch according to the present invention; and FIG. 6 is a sectional view of a roller carrier and clutch teeth of a mechanical clutch according to the present invention.

DETAILED DESCRIPTION

The following description is merely exemplary in nature and is not intended to limit the present disclosure, application, or uses.

Figure 1:
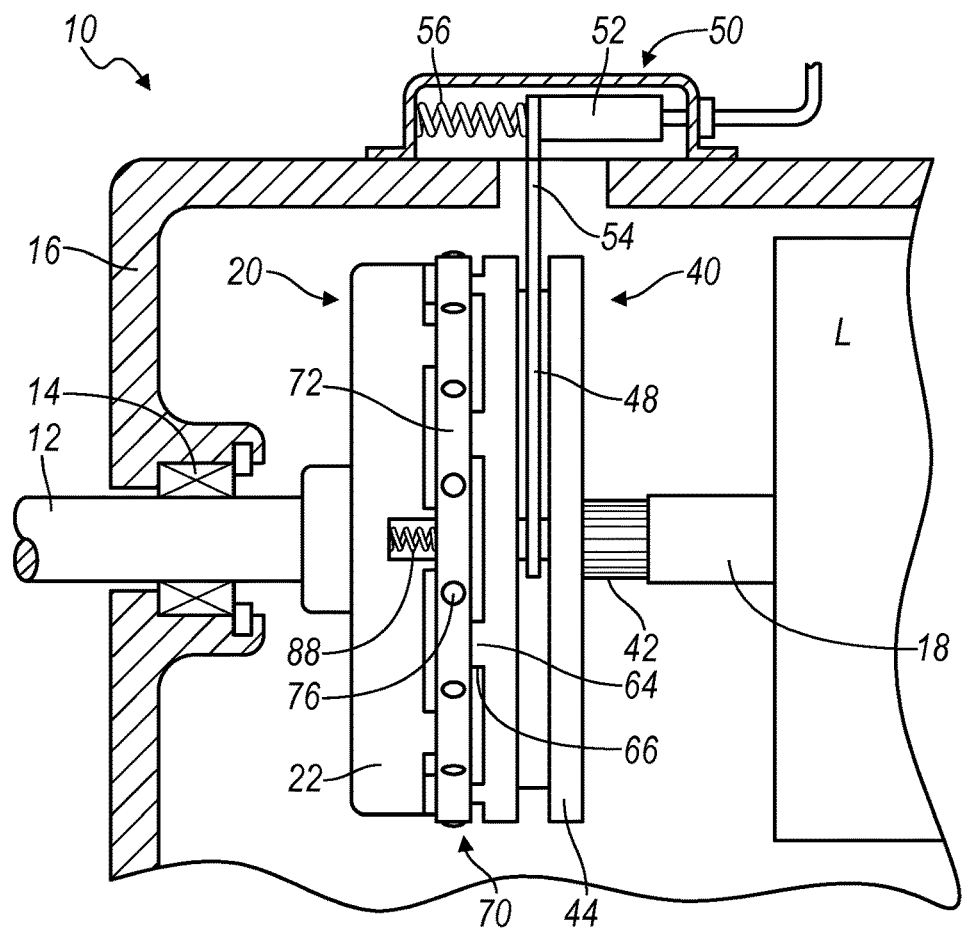
FIG. 1 is a schematic view of a mechanical clutch and operator according to the present invention disposed in a device such as a transmission or transfer case.

With reference now to FIG. 1, a mechanical clutch according to the present invention is illustrated in its operating environment and generally designated by the reference number 10. The mechanical clutch 10, which is of a configuration generally referred to as a dog clutch, is disposed on a drive shaft 12 which is disposed for free rotation on a bearing such as a ball bearing and seal assembly 14 supported and secured within a housing 16 which may be a housing for a transmission, transfer case, differential or other component of a motor vehicle power train or similar mechanical power transfer device or assembly. Spaced from and coaxial to the drive shaft 12 is a driven shaft 18 which is coupled to and drives a load L such as a gear, sprocket, planetary gear assembly or other power transfer device.

The mechanical clutch 10 includes a first, drive element, ring or clutch member 20 which is secured to the drive shaft 12 and a second, driven element, ring or clutch member 40 which is rotationally coupled to the driven shaft 18 by interengaging male and female splines 42 to allow bi-directional, axial motion along the driven shaft 18 while remaining rotationally coupled to it. Alternatively, the first, drive element 20 may be coupled to the drive shaft by interengaging male and female splines and the second, driven element 40 may be secured to the driven shaft 18. As an additional alternative, both of the first and second elements 20 and 40 may be secured to their respective shafts 12 and 18 and one of the shafts 12 and 18 may be axially, bi-directionally translatable.

For purposes of disclosure and without limitation, it will be assumed that the first, drive element 20 is secured to the drive shaft 12 and the second, driven element 40 is coupled to the driven shaft 18 by interengaging splines 42. The second, driven element 40 which defines a generally cylindrical body 44, also includes a circumferential groove or channel 46 which receives a shift fork yoke 48 which is bi-directionally translated by a two position operator or actuator 50. The operator or actuator 50 may include a hydraulically translated piston or an electrically driven solenoid or motor and gear train 52 and includes a bi-directionally translated output member or arm 54 which is connected to and translates the shift fork yoke 48. In either case, the operator or actuator 50 may be powered in both directions or it may include a spring 56 against which the piston or motor 52 moves the output member or arm 54, the shift fork yoke 48 and the second, driven clutch element 40 when activated and which returns the output member or arm 54 and associated components to a null or at disenagaged position when deactivated. The capability of the mechanical clutch 10 to disengage under load with only the force generated by a return spring 56 is a significant feature and benefit of the present invention.

Figure 2:
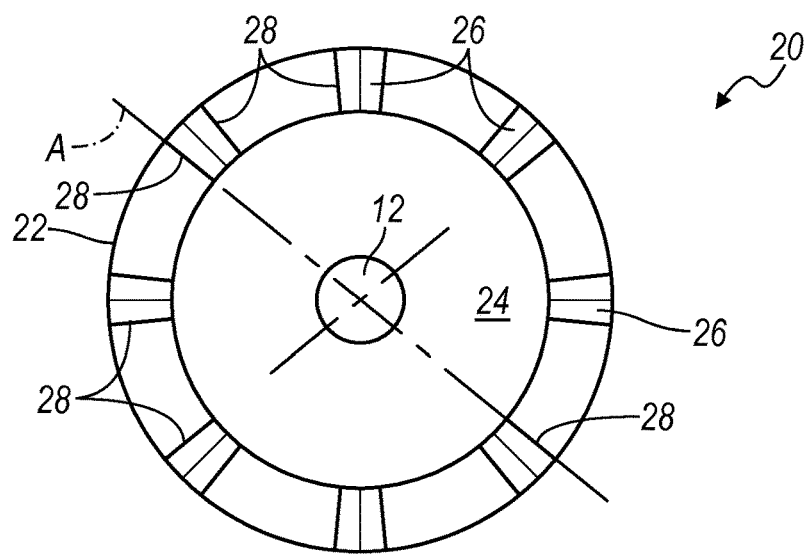
FIG. 2 is a front, elevational view of a drive element or ring of a mechanical clutch according to the present invention.

Referring now to FIGS. 1, 2 and 3, the first, drive element, ring or clutch member 20 also includes a cylindrical body 22 having a circular face 24 which includes a plurality of straight cut projections or teeth 26 adjacent its outer edge. The term "straight cut" means that the side faces 28 of the teeth 26 reside, or substantially reside, in planes passing through the center line of the drive shaft 12 and the first drive element 20. Note the reference plane "A" in FIG. 2 and the side faces 28 of the teeth 26 which lie in it. Stated somewhat differently, the side faces 28 are not angularly or obliquely cut as they may be in certain applications to enhance and maintain clutch tooth engagement. The spacing between opposing (facing) side faces 28 of adjacent teeth 26 is relatively wide: for example, if the width of a tooth 26 is one unit, the spacing between opposing side faces 28 is approximately three units. The reason for this configuration will become apparent subsequently. The number of the teeth 26 will depend on engineering considerations such as the size of the clutch 10, torque load and engagement criteria to name but three. Although eight of the teeth 26 are illustrated in FIG. 2, it should be appreciated that the number can vary widely from, typically no fewer than three or four to ten, twelve and up.

Turning now to the second, driven element 40, as noted, it likewise includes the cylindrical body 44 which defines a circular face 62 which also includes a plurality of straight cut projections or teeth 64 adjacent its outer edge. The term "straight cut" here, too, means that the side faces 66 of the teeth 64 reside, or substantially reside, in planes passing through the center line of the driven shaft 18 and the second, driven element 40. See FIG. 2 which illustrates the same feature with regard to the first, drive element 20. Again, the spacing between opposing (facing) side faces 66 of adjacent teeth 64 is relatively wide: for example, if the width of a tooth 64 is one unit, the spacing between opposing side faces 66 is approximately three units.

Referring now to FIGS. 1, 2 and 5, disposed generally between and concentrically about the first, drive element 20 and the second, driven element 40 is a ball race 70. The ball race 70 includes an outer concentric ring or retaining band 72 having a plurality of outer apertures 74 which maintain a like plurality of balls 76 captive. The ball race 70 also includes an inner concentric ring or retaining band 78 connected to the outer concentric ring or retaining band 72 which has a like plurality of apertures 82. The ball race 70 may be maintained resiliently in position by a plurality of axially extending supports such as leaf springs 88 or similar structures extending between the cylindrical body 22 and the concentric ring or retaining band 72.

Referring now to FIG. 6, an alternative to the ball race 60 is illustrated. Here, a roller race 90 includes an outer concentric ring or retaining band 92 having a plurality of outer apertures 94 which maintain a like plurality of tapered rollers 96 captive. The roller race 90 also includes an inner concentric ring or retaining band 98 connected to the outer concentric ring or retaining band 92 which has a like plurality of apertures 102 which receive inner ends of the rollers 96. The roller race 90 may be maintained in position by structures similar to that illustrated in FIG. 1 and functions in essentially the same manner as the ball race 70.

With reference to FIGS. 3 and 4, operation of a mechanical clutch 10 such as a dog clutch according to the present invention, which is straightforward, will now be described. Engagement involves actuation of the actuator or operator 50 to translate the second, driven element, ring or clutch member 40 to the left in FIG. 1 thereby causing the teeth 64 of the second, driven element 40 to move into engagement with the teeth 26 on the first, drive element 40. Note that each of the teeth 26 is separated from each of the teeth 64 by one of the plurality of balls 76. Note also that in FIG. 3, the first, drive element 20 is rotating such that it is moving up and thus that only alternate balls 76 (the one at the bottom and the one three up from the bottom) are transferring torque.

FIG. 4 illustrates a partially disengaged clutch 10. Here the actuator or operator 50 has received a disengage command and the second, driven element 40 has moved to the right in FIG. 4. Because both the teeth 26 and 64 are straight cut or substantially so, and the balls 76 rotate and thus greatly reduce sliding friction between what would otherwise be direct tooth-to-tooth contact, the clutch 10 can be easily disengaged, even under load and even with a relatively small and low power actuator or operator 50 or a return spring 56, as noted above. Note that in FIG. 4, the center ball 76, which is in contact with the side 28 of the tooth 26 below it and the side 66 of the tooth 64 above it, will rotate clockwise as the clutch 10 disengages. This capability provides an order of magnitude increase in effective gain for a normally off clutch. Additional benefits include improved fuel economy and electric range in electrified (hybrid) powertrains because of reduced energy consumption.

The description of the invention is merely exemplary in nature and variations that do not depart from the gist of the invention are intended to be within the scope of the invention. Such variations are not to be regarded as a departure from the spirit and scope of the invention.

What is claimed is:

1. A mechanical clutch comprising, in combination,
   a first clutch element disposed on an axis and having a first plurality of straight cut teeth having first side faces residing in first reference planes passing through said axis,
   a second clutch element disposed on said axis and having a second plurality of straight cut teeth having second side faces residing in second reference planes passing through said axis,
   a carrier disposed on said axis between said first and said second clutch elements and having an inner ring, an outer ring coupled to said inner ring and a plurality of balls disposed for rotation between said inner ring and said outer ring, and
   a plurality of springs connecting said carrier to said first clutch element,
   whereby torque is transmitted between said first clutch element and said second clutch element from said side faces of one of said clutch elements, through said plurality of balls to said side faces of another of said clutch elements.

2. The mechanical clutch of claim 1 further including an actuator for translating said second clutch element into engagement with said first clutch element.

3. The mechanical clutch of claim 2 further including a shift fork extending between said actuator and said second clutch element.

4. The mechanical clutch of claim 1 further including a biasing spring biasing one of said clutch elements into disengagement.

5. The mechanical clutch of claim 4 wherein said biasing spring is a compression spring.

6. The mechanical clutch of claim 1 wherein said first clutch element is secured to a first shaft disposed on said axis and said second clutch element is splined to a second shaft disposed on said axis.

7. A mechanical clutch comprising, in combination,
   a first clutch element disposed on an axis and having a first plurality of straight teeth having first side faces residing in first reference planes passing through said axis,
   a second clutch element disposed on said axis and having a second plurality of straight teeth having second side faces residing in second reference planes passing through said axis,
   a shift fork engaging said second clutch element,
   an actuator for translating said shift fork and said second clutch element into engagement with said first clutch element,
   a biasing spring for biasing said shift fork and said second clutch element out of engagement with said first clutch element,
   a carrier disposed on said axis between said first and said second clutch elements and having an inner ring, an outer ring coupled to said inner ring, a plurality of springs connecting said carrier to said first clutch element and a plurality of friction reducing elements disposed for rotation between said inner ring and said outer ring, and
   whereby torque is transmitted between said first clutch element and said second clutch element from said side faces of one of said clutch elements, through said plurality of friction reducing elements to said side faces of another of said clutch elements.

8. The mechanical clutch of claim 7 wherein said friction reducing elements are rollers.

9. The mechanical clutch of claim 7 wherein said friction reducing elements are balls.

10. The mechanical clutch of claim 7 wherein said biasing spring is a compression spring.

11. The mechanical clutch of claim 7 wherein said first clutch element is secured to a first shaft disposed on said axis and said second clutch element is splined to a second shaft disposed on said axis.

12. The mechanical clutch of claim 7 wherein said actuator includes a piston and is operated by hydraulic fluid.

13. A mechanical clutch comprising, in combination,
    a first clutch element disposed on an axis and having a first plurality of straight teeth having first side faces residing in first reference planes passing through said axis,
    a second clutch element disposed on said axis, facing said first clutch element and having a second plurality of straight teeth having second side faces residing in second reference planes passing through said axis,
    a shift fork engaging said second clutch element,
    an actuator for translating said shift fork and said second clutch element into engagement with said first clutch element,
    a carrier disposed on said axis between said first and said second clutch elements and having an inner ring, an outer ring coupled to said inner ring and a plurality of friction reducing elements disposed for rotation between said inner ring and said outer ring, and
    a plurality of springs resiliently connecting said carrier to said first clutch element,
    whereby torque is transmitted between said first clutch element and said second clutch element from said side faces of one of said clutch elements, through said plurality of friction reducing elements to said side faces of another of said clutch elements.

14. The mechanical clutch of claim 13 further including a biasing spring for biasing said shift fork and said second clutch element out of engagement with said first clutch element.

15. The mechanical clutch of claim 14 wherein said biasing spring is a compression spring.

16. The mechanical clutch of claim 13 wherein said first clutch element is secured to a first shaft disposed on said axis and said second clutch element is splined to a second shaft disposed on said axis.

17. The mechanical clutch of claim 13 wherein said friction reducing elements are rollers.

18. The mechanical clutch of claim 13 wherein said friction reducing elements are balls.

* * * * *